United States Patent
Suzuki et al.

(10) Patent No.: US 6,442,127 B2
(45) Date of Patent: *Aug. 27, 2002

(54) MOUNT FOR RECORDING MEDIA AND RECORDING MEDIA LIBRARY APPARATUS USING THE MOUNT

(75) Inventors: Hiroyuki Suzuki; Katsumasa Yokoyama; Satoshi Ogasawara, all of Kanagawa (JP)

(73) Assignee: Hitachi Electronic Engineering Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,204

(22) Filed: Mar. 10, 1999

(30) Foreign Application Priority Data

Mar. 11, 1998 (JP) .......................................... 10-078454

(51) Int. Cl.[7] .......................... G11B 17/04; G11B 17/08
(52) U.S. Cl. ................................................. 369/178.01
(58) Field of Search ................................. 369/176, 178, 369/192, 201, 202, 34, 36, 289, 290, 75.2, 178.01; 360/92

(56) References Cited

U.S. PATENT DOCUMENTS

| 3,526,406 A | * | 9/1970 | Blackie et al. ................. 360/92 |
| 3,764,202 A | * | 10/1973 | Iha ................................ 352/123 |
| 4,278,258 A | * | 7/1981 | Fujita et al. .................... 369/36 |
| 4,589,101 A | * | 5/1986 | Schatteman et al. ........... 369/38 |
| 4,706,237 A | * | 11/1987 | Nakayama ................... 369/75.1 |
| 4,800,554 A | * | 1/1989 | Yamasaki et al. ............ 369/291 |
| 4,817,079 A | * | 3/1989 | Covington .................... 360/133 |
| 4,974,102 A | * | 11/1990 | Hamachi et al. ............... 360/92 |
| 5,528,567 A | * | 6/1996 | Kim ............................... 369/37 |
| 5,781,523 A | * | 7/1998 | Ozawa et al. ................ 369/77.1 |
| 5,903,538 A | * | 5/1999 | Fujita et al. ................. 369/178 |
| 5,970,040 A | * | 10/1999 | Bando .......................... 369/178 |
| 6,009,069 A | * | 12/1999 | Yamashita et al. ........... 369/178 |
| 6,014,353 A | * | 1/2000 | Kong et al. ..................... 369/36 |
| 6,072,657 A | * | 6/2000 | Konno .......................... 360/92 |
| 6,169,720 B1 | * | 1/2001 | Kamemura et al. ......... 369/75.2 |

\* cited by examiner

*Primary Examiner*—Robert S. Tupper
*Assistant Examiner*—Julie Anne Watko
(74) *Attorney, Agent, or Firm*—Morrison & Foerster LLP

(57) ABSTRACT

Tray supporting a recording medium is transferred horizontally to a designated destination component and stored in the destination component along with the recording medium. The tray has one end facing the destination component and this one end has a surface slanted with respect to a front wall surface of an entry/exit of the destination component. With the provision of such a slanted end surface, even when the tray being transferred comes into collision with the front wall, the tray is allowed to gradually slide along the wall surface into the destination component. As a consequence, the recording medium supported on the tray can be smoothly passed into the destination component.

10 Claims, 7 Drawing Sheets

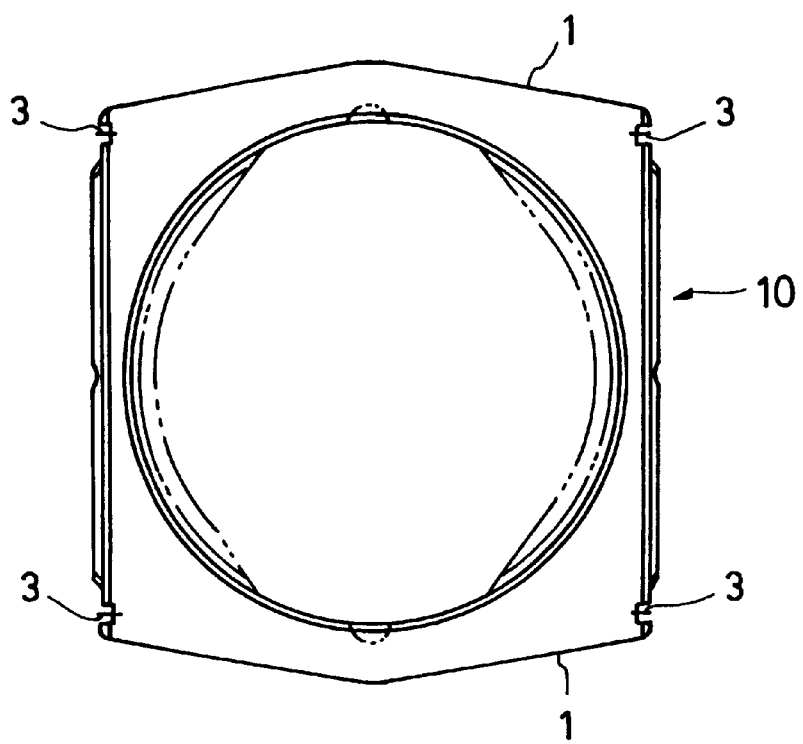
F I G. 3 A
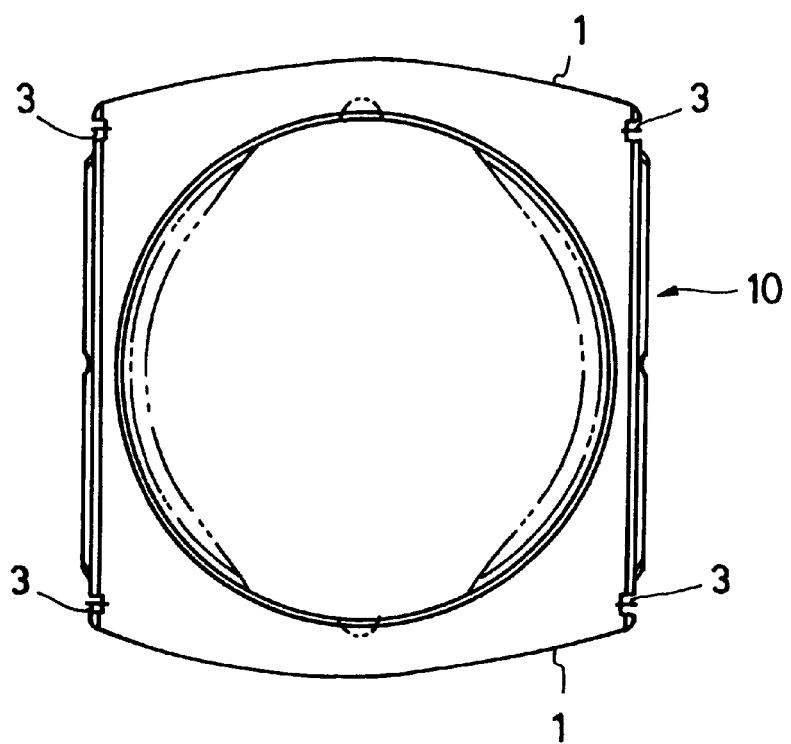
F I G. 3 B

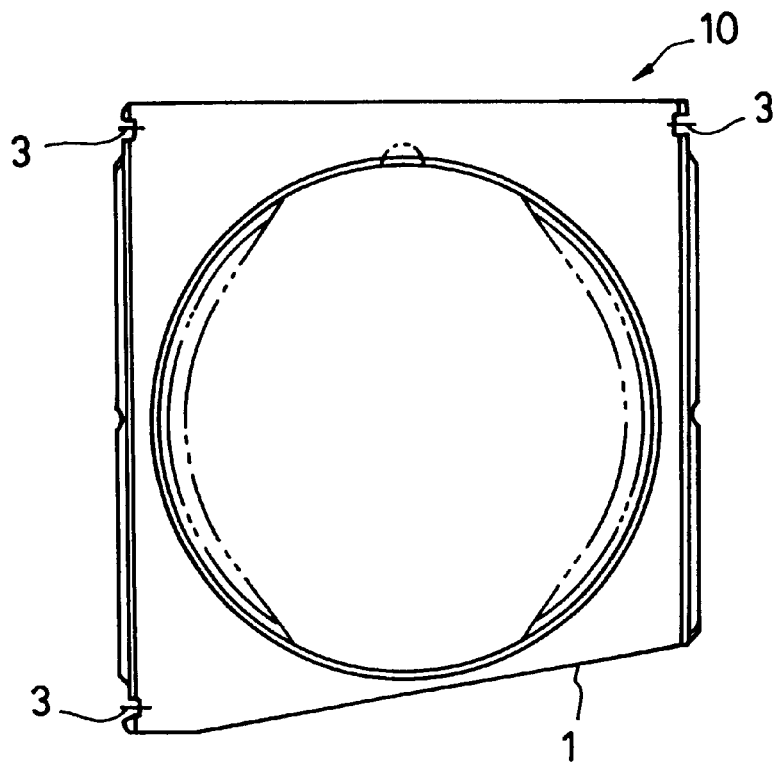
F I G. 4 A
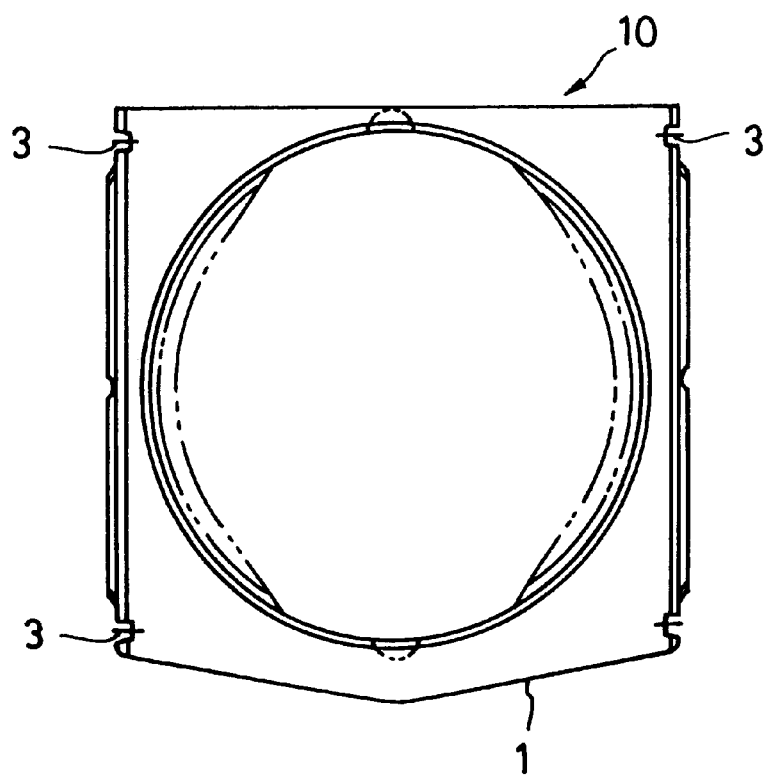
F I G. 4 B

MOUNT FOR RECORDING MEDIA AND RECORDING MEDIA LIBRARY APPARATUS USING THE MOUNT

BACKGROUND OF THE INVENTION

The present invention relates generally to medium trays for use in recording media library apparatuses of the type which transfers a designated recording medium by transferring a tray supporting thereon the recording medium, and more particularly to an improved technique for achieving a smooth transfer of the medium tray through simplified positioning control.

Conventionally-known recording media library apparatuses (hereinafter also referred to as "library apparatuses") are designed in such a way that a recording medium, such as an optical disk, contained in a predetermined case or cartridge is transported automatically by a computer-controlled carrying holder unit between a storage unit and a medium drive unit and the thus-transported medium is driven via the drive unit for data read/write. Namely, such library apparatuses generally comprise the carrying holder unit automatically-controlled for retaining and transporting a designated recording medium, usually in horizontal and vertical directions, the storage unit for storing a multiplicity of the recording media in respective storage cells (or on respective storage racks), and the medium drive unit that reads and/or writes data on the recording medium. The carrying holder unit includes a handling (or feed-transfer) mechanism which function to pass a recording medium between a selected one of the storage cells and the drive unit.

More and more DVDs (Digital Versatile Disks) have been used as high-density digital recording media in recent years. However, so far, there has been proposed no library apparatus capable of efficiently handling the DVD recording media.

In some of the library apparatuses handling disk-shaped recording media, such as DVDs (Digital Versatile Disks) or CDs (Compact Disks), or other-type recording media which can not be directly retained by the carrying holder unit for the transfer purpose, each of the media is supported on a separate mount or tray (i.e., one tray per recording medium) and handled or transferred along with the tray. One typical example of the conventionally-known tray is shown in FIG. 9. This tray 100 is square or rectangular in shape and has a plurality of engaging recesses (commonly known as "pick notches" in the art) 102 formed near its corners. In FIG. 9, a locking claw or picker 40 of a carrying holder unit 20 is shown as being in engagement with a particular one of the engaging recesses 102a. The locking claw 40 thus engaging the recess 102a is moved in the horizontal direction (denoted by arrow X) to transfer the tray 100 to or from the holder unit 20.

The tray 100 is sometimes transferred with some vertical (upward or downward) inclination relative to the horizontal transfer direction X. If such an inclination of the tray 100 is greater than a tolerable degree, the leading end 101 (as viewed in the direction where the tray 100 is being transferred) of the tray 100 would collide against a front wall portion of the holder unit 20 defining its medium entry/exit opening (hereinafter called a "medium entry/exit"). For example, when the tray 100 is pulled out of one of a plurality of storage cells of the storage unit (not shown) into the carrying holder unit 20, the leading end 101 may collide against the entry/exit of the holder unit 20, and when the tray 100 is sent out from the holder unit 20 into the storage cell, the other end (leading end at this time) 101 may collide against a front wall portion of the storage cell defining its entry/exit opening (hereinafter called a "medium entry/exit"). Because of the square or rectangular shape, the leading end of the conventionally-known tray 100 normally comes into a collision with the entry/exit while maintaining parallel relationship to the entry/exit.

However, with the recording media library apparatuses using such a conventional square- or rectangle-shaped tray for transfer of a recording medium, it was usually necessary to suspend the intended transfer of the tray each time the tray collided with the entry/exit of the storage cell or holder unit, which substantially lowered the efficiency in the necessary transfer of the recording media. Therefore, various attempts and suggestions have been made to avoid such an unwanted collision. One of the approaches proposed so far is to just cause the two engaging recesses, formed in opposite side edges adjacent to the leading end, to be engaged simultaneously so that the tray can be transferred with the tray's leading end portion kept in the horizontal plane to thereby prevent a vertical inclination of the entire tray. However, such an approach would require a complicated tray transfer mechanism, thus resulting in an increased size and manufacturing cost of the library apparatus.

SUMMARY OF THE INVENTION

It is therefore an object of the present invention to provide a recording media library apparatus which permits a continued smooth transfer of a medium tray even when the tray, due to its inclination, collides at its leading end against a medium entry/exit of a designated destination component of the apparatus.

In order to accomplish the above-mentioned object, the present invention provides a mount for a recording medium, which is transferred at least in a predetermined horizontal transfer direction to be passed to a designated destination component in such a way that the recording medium supported on the mount is received, along with the mount, in place within the destination component, and which is characterized in that the mount has one end surface oriented in the horizontal transfer direction and the one end surface is slanted with respect to a direction normal to the horizontal transfer direction.

The term "destination component" is used herein to generically refer to every such component which is arranged to receive a recording medium transferred on the mount, and examples of the destination component include storage cells (or storage racks), medium carrying holder unit and medium drive unit in a recording media library apparatus.

According to another aspect of the present invention, there is provided a recording media library apparatus which comprises: a mount for supporting thereon a recording medium, the mount having at least one end surface oriented in a predetermined horizontal transfer direction thereof, the one end surface being slanted with respect to a direction normal to the horizontal transfer direction; a storage section that stores therein a plurality of the mounts each supporting the recording medium; a medium drive unit that reads and/or write data on the recording medium; and a transportation mechanism that carries the mount between the storage section and the medium drive unit and performs a predetermined handling operation to pass, in the horizontal transfer direction, the mount to or from the storage section or the medium drive unit. In this library apparatus, even when the mount being transferred comes into collision with the front wall of the storage section, medium drive unit or carrying holder unit which is designated as the destination component, the mount is allowed to gradually slide along the wall surface into a predetermined place within the destination component, so that the recording medium supported on the mount can be smoothly passed into the destination component.

With the conventionally-known mounts, a large area of the one end surface, oriented in the tray-transfer direction, would simultaneously contact (or collide against) a front wall surface of the entry/exit of the designated destination component. The provision of the slanted end surface can effectively reduce the area of the simultaneous contact with the front wall surface of the designated destination component. The reduced area of the contact between the end surface of the mount and the destination component achieves a significantly reduced frictional resistance therebetween. The reduced frictional resistance will achieve a smooth sliding movement of the medium tray into the destination component such as the storage cell, holder unit or drive unit.

Because the mount can be smoothly transferred and inserted into the designated destination component even when it initially comes into a collision with the front wall surface of the medium entry/exit of the destination component in the above-mentioned manner, the present invention eliminates a need for accurately positioning the carrying holder unit relative to the medium entry/exit, which greatly simplifies the necessary positioning control. With the thus-simplified positioning control, the mechanism for carrying the mount can also be significantly simplified, with the result that the cost and size of the recording media library apparatus can be reduced greatly as compared to the known library apparatuses.

BRIEF DESCRIPTION OF THE DRAWINGS

For better understanding of the object and other features of the present invention, its preferred embodiments will be described in greater detail hereinbelow with reference to the accompanying drawings, in which:

FIGS. 3A and 3B are top plan views of a medium tray in accordance with still another embodiment of the present invention;

FIGS. 4A and 4B are top plan views of a medium tray in accordance with still another embodiment of the present invention;

DETAILED DESCRIPTION OF THE PREFERRED EMBODIMENTS

Figure 8:
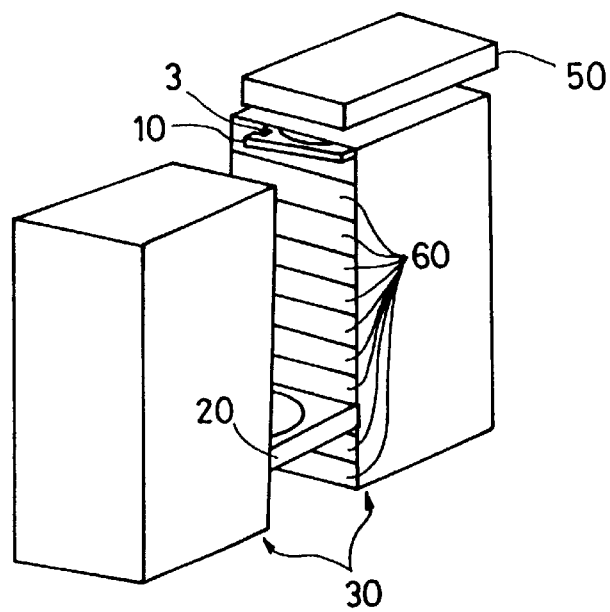
FIG. 8 is a perspective view schematically showing a general organization of a recording media library using the medium tray in accordance with the present invention.

FIG. 8 is a perspective view schematically showing a general organization of a recording media library using a medium tray 10 in accordance with an embodiment of the present invention. This recording media library apparatus includes a carrying holder (carrier) unit 20 for transporting a designated recording medium in the library apparatus, two storage units 30 having a plurality of storage cells 60 (or storage racks), and a medium drive unit 50 for reading or writing data on the recording medium. Although not specifically shown, the recording media library apparatus also includes a transportation mechanism for positioning the carrying holder unit 20 in a desired location within the library apparatus, such as a selected one of the storage cells 60 (or the storage racks) or the medium drive unit 50.

Figure 1A:
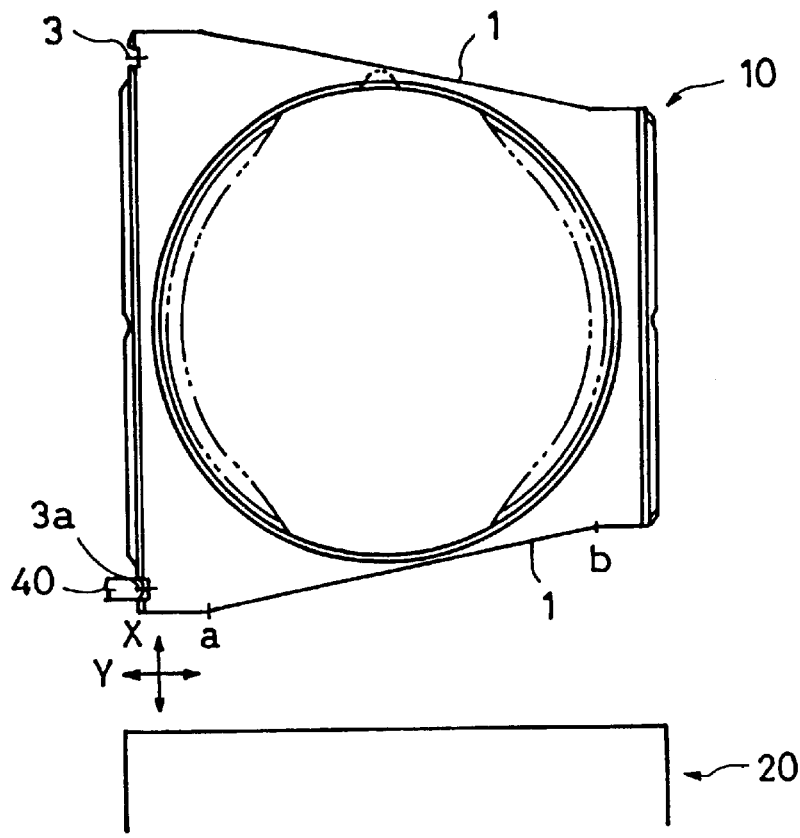
FIGS. 1A, 1B and 1C are a top plan and perspective views, respectively, of a medium tray in accordance with an embodiment of the present invention, which has one end surface linearly slanted.
Figure 1B:
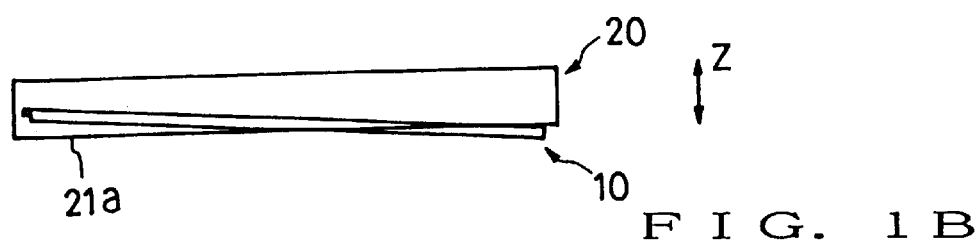
Figure 1C:
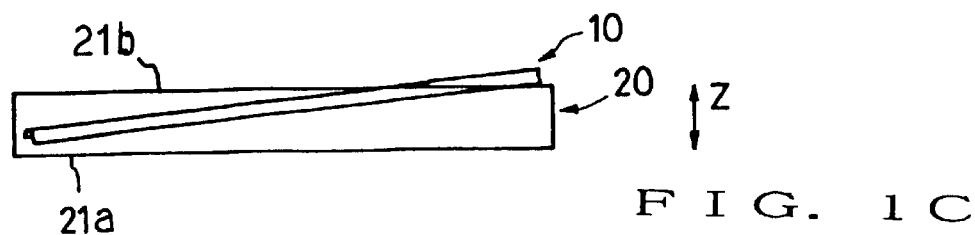

FIG. 1A is a top plan view of a medium tray 10 in accordance with an embodiment of the present invention, which, as shown, is generally in the shape of a trapezoid having two ends 1 (i.e., leading and trailing ends as viewed in a horizontal transfer direction X of the tray 10) partly slanted inwardly, i.e., toward each other with respect to a direction of arrow Y normal to the horizontal tray-transfer direction X. FIGS. 1B and 1C show the medium tray 10 and carrying holder unit 20 as viewed in the direction X, i.e., from the top to bottom on the sheet of FIG. 1A.

While each tray 10 supporting a single recording medium is normally settled in place within a predetermined component, such as the storage cell 60, in the library apparatus, FIG. 1A, for simplicity of illustration, shows only the medium tray 10 and the carrying holder unit 20 as a destination component into which the tray 10 is to be inserted. Further, in FIG. 1A, a solid-line circle on the medium tray 10 denotes an area on which the recording medium is to be placed. In the embodiment of FIG. 1A, each of the two ends has a surface that is linearly slanted inwardly, with respect to the arrow-Y direction normal to the horizontal tray-transfer direction X, between point "a" adjacent to one of a plurality of engaging recesses or pick notches 3 formed in one of opposite sides of the tray 10 and point "b" remote from the engaging recess 3; thus, the distance of the end surface from a medium entry/exit of the carrying holder unit 20 becomes greater at areas of the tray remoter from the engaging recess 3.

Now, with reference to FIG. 1, a description will be made about an exemplary manner in which the medium tray 10 is passed from one of the storage cells 60 to the carrying holder unit 20.

First, the holder unit 20 is moved to such a position to properly confront the designated storage cell 60 storing the medium tray 10 in question (see FIG. 8). Then, a locking claw 40 of the carrying holder unit 20 is brought into engagement with one of the engaging recesses 3a closer to the carrying holder unit 20, to thereby start transferring the tray 10 in the arrow-X direction. At that time, there is a likelihood of the medium tray 10 being transferred in a posture inclined vertically (direction denoted by arrow Z) with one of the two sides having the engaging recess 3a (left side in the illustrated example of FIG. 1B) lying at a higher level than the other side (right side in the illustrated example of FIG. 1B). If the medium tray 10 is transferred with such a vertical inclination, one of the ends of the tray 10 facing the holder unit 20 will sometimes collide against a lower wall portion 21a of the entry/exit of the holder unit 20. In such a case, however, the tray 10 of the present invention arranged in the above-mentioned manner can be smoothly inserted though the entry/exit into a predetermined place of the holder unit 20, by the function of the inwardly slanted end surface of the tray 10. Namely, according to the embodiment, only a limited end portion of the tray 10, closest to the holder unit 20, first comes into a collision with the lower wall portion 21*a* of the entry/exit of the holder unit 20, which can effectively reduce a frictional resistance between the tray end surface and the lower wall portion 21*a* of the entry/exit and thereby achieves a smooth sliding contact therebetween. Thus, as the transfer of the medium tray 10 progresses, the tray can be gradually adjusted into a proper horizontal posture by the function of the slanted end surface being slidingly guided by the lower wall portion 21*a* of the entry/exit. In this way, the medium tray 10 can be smoothly passed into the holder unit 20 while the slanted end surface smoothly slides along the lower wall portion 21*a* of the entry/exit without being caught by the lower wall portion 21*a*.

Conversely to the example of FIG. 1B, the medium tray 10 may be transferred in a vertically-inclined posture with the one side having the engaging recess 3*a* (left side in the illustrated example of FIG. 1C) lying at a lower level than the other side (right side in the illustrated example of FIG. 1C). In this case, as the transfer of the medium tray 10 progresses, the tray can be gradually adjusted into a proper horizontal posture by the slanted end surface being slidingly guided by an upper wall portion 21*b* of the entry/exit of the holder unit 20. Thus, similarly to the example of FIG. 1B, the medium tray 10 can be smoothly passed into the holder unit 20 while the slanted end surface smoothly slides along the upper wall portion 21*b* of the entry/exit without being caught by the upper wall portion 21*b*.

While FIGS. 1A–1C shows one embodiment of the medium tray 1 having the engaging recesses 3 only in one of the two sides (left side), the tray 1 may have such engaging recesses 3 only in the other side (right side) or in both of the left and right sides.

Figure 2A:
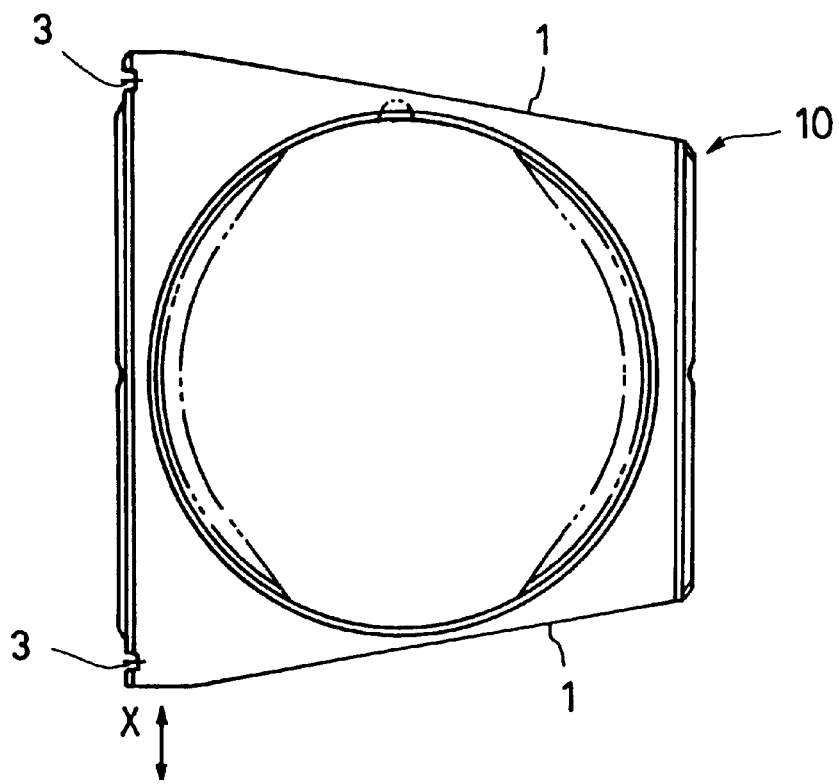
FIGS. 2A and 2B are top plan views of a medium tray in accordance with another embodiment of the present invention.

FIG. 2A is a top plan view of a medium tray 10 in accordance with another embodiment of the present invention, where each of the two ends has a surface that is linearly slanted inwardly, with respect to the arrow-Y direction normal to the horizontal tray-transfer direction X, along a substantially full length thereof. Further, FIG. 2B is a top plan view of a medium tray 10 in accordance with still another embodiment of the present invention, where each of the two ends has a surface that is nonlinearly or arcuately slanted inwardly, with respect to the arrow-Y direction normal to the horizontal tray-transfer direction X, along a substantially full length thereof.

Figure 2B:
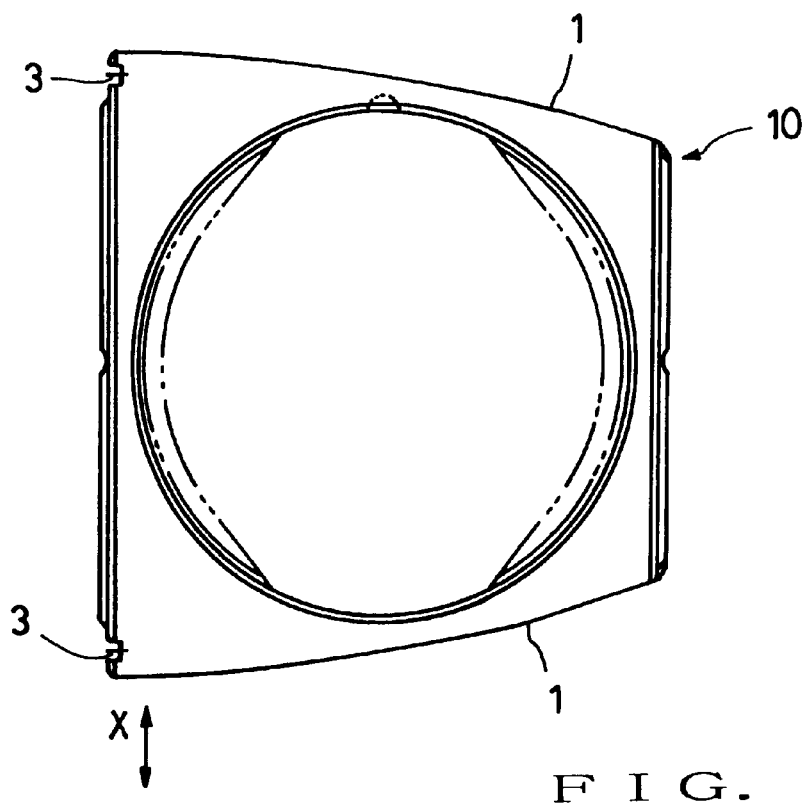

In the embodiments of FIGS. 2A and 2B too, as the transfer of the medium tray 10 progresses, the tray can be gradually adjusted into a proper horizontal posture by the slanted end surface being slidingly guided by the lower or upper wall portion of the entry/exit. In this way, the medium tray 10 can be smoothly passed into the holder unit 20. It should be obvious that the arcuately-slanted end surface shown in FIG. 2B achieves a smoother sliding movement of the tray 10 along the lower or upper wall portion of the entry/exit than the linearly-slanted end surfaces of FIGS. 1A and 2A.

Figure 9:
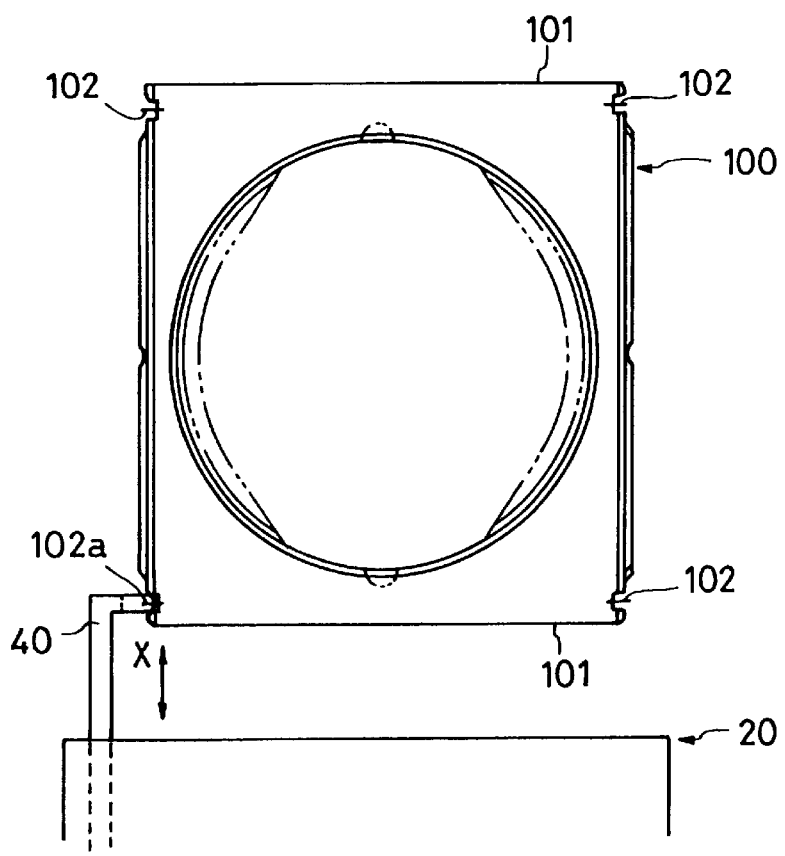
FIG. 9 is a top plan view of one typical example of the conventionally-known tray.

In addition, the above-described embodiments can effectively prevent erroneous insertion of the medium tray 10. Namely, the conventionally-known medium trays would be often inserted in wrong directions, because it is difficult to properly distinguish between the obtuse and reverse and the front and rear of the tray due to the square or rectangular shape as shown in FIG. 9.

Further, FIG. 3A is a top plan view of a medium tray 10 in accordance with still another embodiment of the present invention, where each of the two ends has a surface that is linearly slanted inwardly, from a midpoint thereof, in both the leftward and rightward directions, i.e., toward the opposite sides of the tray, to thereby form a "dog-legged" end surface; that is, the distance of the end surface from the medium entry/exit is smallest at the midpoint and becomes gradually greater at areas remoter from the midpoint. FIG. 3B is a top plan view of a medium tray 10 in accordance with still another embodiment of the present invention, which is similar to the embodiment of FIG. 3A but different therefrom in that each of the end surface is arcuately slanted from a midpoint thereof in both the leftward and rightward directions.

If, in the embodiments of FIGS. 3A and 3B, the midpoint of the end surface of the tray 10 being transferred happens to get under the lower wall portion 21*a* of the entry/exit, then the tray 10 slides along downward rather than upward and thus can not be inserted into the entry/exit at all. For this reason, with the embodiments of FIGS. 3A and 3B, some arrangement is required for preventing the midpoint from of the slanted end surface accidentally getting under the lower wall portion 21*a* of the entry/exit during transfer to the holder unit 20. Namely, in these embodiments, it is necessary to more properly position the tray 10 relative to the vertical (arrow-Z direction) plane of the carrying holder unit 20 than in the other embodiments shown in FIGS. 1A to 2B; such vertical positioning of the tray 10 must be done more accurately at end surface areas remoter from the engaging recess 3 that is to be engaged by the locking claw 40 of the holder unit 20.

It will be appreciated that each of the trays 10 shown in FIGS. 1A to 3B is designed to be transferred in two directions as denoted by double-head arrow X, i.e., in the bottom-to-top direction as well as in the top-to-bottom direction on the sheets of these figures, for insertion into various "destination" components, such as the storage cells and medium drive unit 50, disposed to the opposite sides of the "bidirectional-accessing-type" carrying holder unit 3. This is why each of the medium trays 10 has the slanted surfaces at their opposite ends along the horizontal tray-transfer direction X as described above. Thus, in other-type recording media library apparatuses where the each medium tray 10 is always inserted into various destination components only in one direction, the tray 10 may have the slanted surface at only one of the ends as shown in FIG. 4A or 4B.

Figure 5:
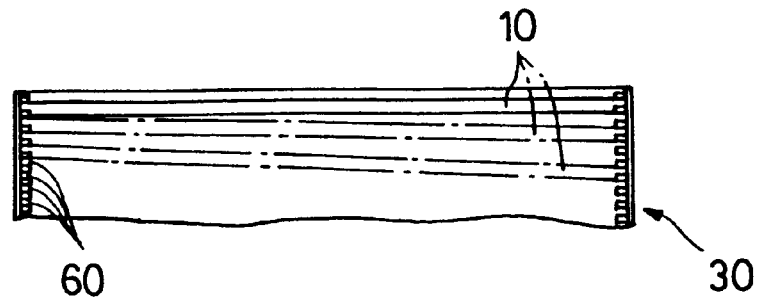
FIG. 5 is a schematic front view showing how the medium trays are stored in respective storage cells that are not partitioned off from each other.

For efficient operation of the medium tray 10 of the present invention, it is desirable that the medium entry/exit of each storage cell 60 in the storage unit 30 be clearly defined by a pair of upper and lower horizontal partitions (corresponding to the upper and lower wall portion 21*b* and 21*a*). However, the present invention may also be applied to a case where the medium entry/exit of each storage cell 60 in the storage unit 30 is not defined by a completely rectangular wall, i.e., where there are no specific upper and lower partitions corresponding to the upper and lower wall portion 21*b* and 21*a*. Because, in such a case, those trays 10 appropriately stored in the respective storage cells 60 can function as the partitions corresponding to the upper and lower wall portion 21*b* and 21*a*. Namely, in the illustrated example of FIG. 5, when the tray 10 is transferred toward one of the storage cells 60, i.e., a designated "destination" storage cell, in an inclined posture relative to the cell 60, and if there is already stored another medium tray 10 in another storage cell 60 immediately underneath the destination storage cell 60, then the medium tray 10 being transferred will abut against the other medium tray 10. However, according to the present invention, the other medium tray 10 can serve just like the above-mentioned lower wall portion 21*a* of the entry/exit, along which the tray 10 being transferred is allowed to smoothly slide into the destination storage cell

Figure 6:
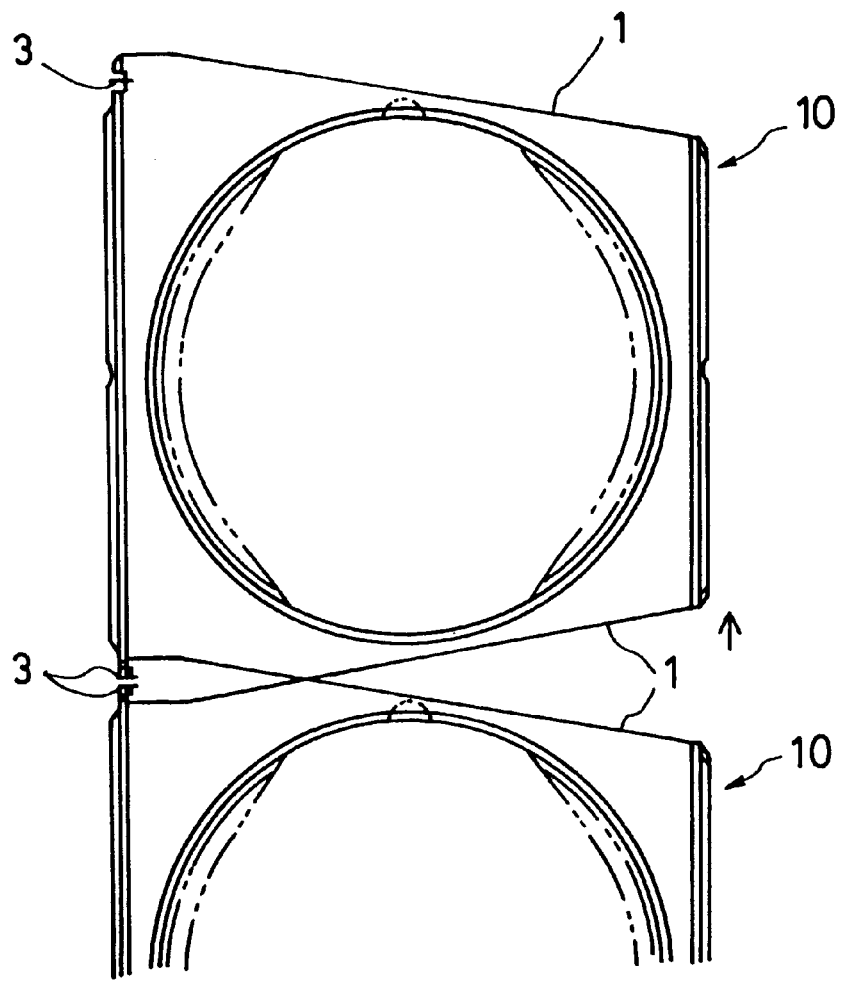
FIG. 6 is a top plan view showing how the tray is introduced into a designated destination storage cell while sliding along another medium tray already stored in the cell underneath the destination storage cell.

60. FIG. 6 is a top plan view showing how the tray 10 is introduced into the designated destination storage cell 60 while sliding along the other medium tray 10' already stored in the cell underneath the destination storage cell 60.

Figure 7A:
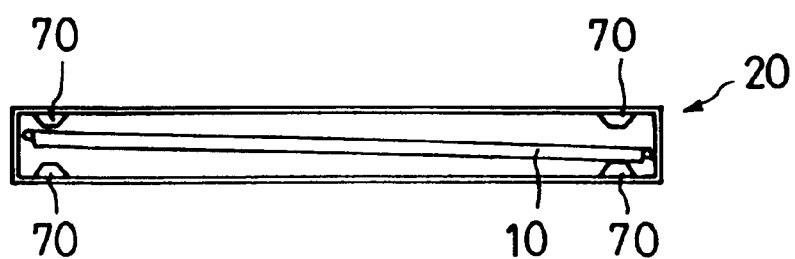
FIGS. 7A, 7B and 7C are a front, perspective and plan views, respectively, of a carrying holder unit suitable for use with the tray of the present invention.
Figure 7B:
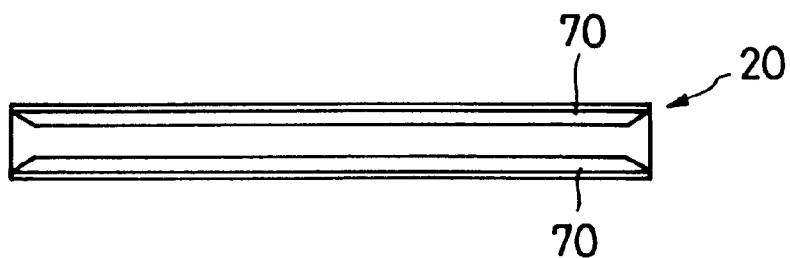
Figure 7C:
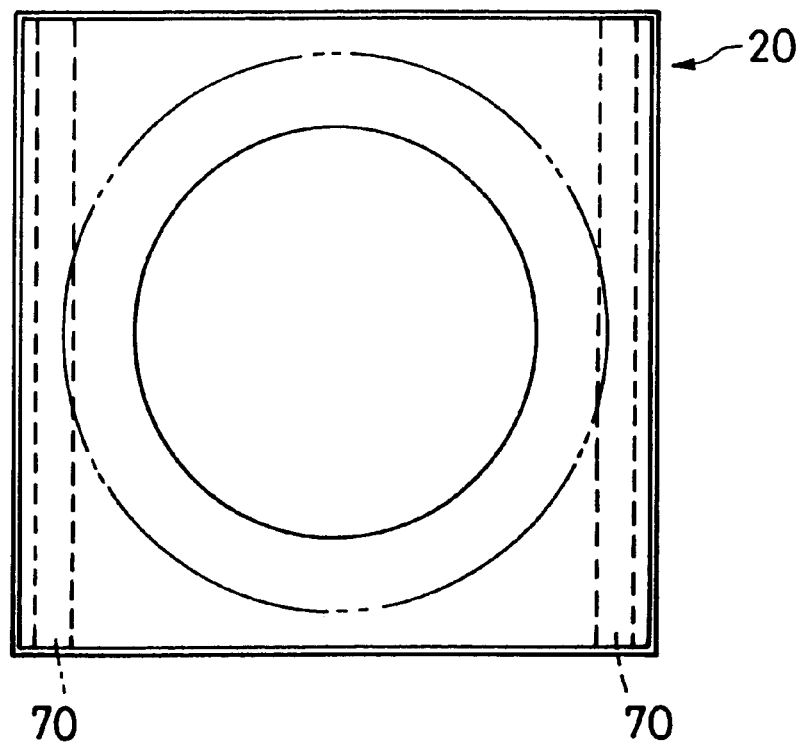

FIG. 7A is a front view of a carrying holder unit 20 which contains four elongate tray guide members 70 extending along the tray-transfer direction, FIG. 7B is a schematic side view of the holder unit 20 shown in FIG. 7B, and FIG. 7C is a bottom view of the holder unit 20.

Because the medium tray 10 of the present invention is designed to be slidingly introduced into the holder unit 20, the tray 10 being introduced is placed in contact with the bottom surface. As the tray 10 moves deeper into the holder unit 20, the area of the contact between the tray 10 and the bottom surface of the holder unit 20 becomes greater, which would result in a greater frictional resistance therebetween. The provision of the elongate tray guide members 70 having a small surface area effectively reduces the area of the contact between the tray 10 and the holder unit 20 to thereby achieve a significantly reduced frictional resistance therebetween. The reduced frictional resistance will achieve an even smoother insertion of the medium tray 10 into the holder unit 20.

Although four tray guide members 70 are shown in FIG. 7A, the number of such guide members 70 may be three or less or even just one. Further, such tray guide members 70 may be provided in any other suitable positions than shown in FIGS. 7A and 7B and may have any other suitable shape than shown. However, it is preferable that each of the tray guide members 70 have a front end tapered outwardly, to provide a guide surface that facilitates a smooth entry of the tray 10.

It should be obvious that the entry/exit of the carrying holder unit 20 for use with the present invention needs to be defined by a wall having a rectangular sectional shape; however, the bottom or base of the holder unit 20 may have one or more holes as long as they are small enough to prevent the recording medium from falling therethrough from the tray 10 when the medium is inserted in an inclined position (see FIG. 7C). Further, it should be noted that one or more tray guide members as described above may be provided in any other destination component (into which the tray 10 is to be transferred) than the carrying holder unit 20, such as the storage cells 60 or the medium drive unit 50.

Whereas the present invention has been described above as transferring the medium tray 10 by means of the locking claw or picker 40 of the carrying holder unit 20, the invention is not necessarily so limited; the tray 10 may be transferred by any other suitable means, such as one for pushing, rather than pulling, the tray 10 toward a designated destination component.

Furthermore, whereas various preferred embodiments of the present invention have been described primarily as a tray supporting a recording medium, the principle of the present invention may be embodied as a cartridge or other form of a mount for supporting a recording medium. Where the invention is embodied as a cartridge, the cartridge may have one end surface slanted with respect to a direction normal to a predetermined cartridge-transfer direction.

In summary, the present invention is characterized in that the mount has one end surface oriented in the horizontal transfer direction is slanted with respect to a direction normal to the horizontal transfer direction, the present invention permits the tray to be smoothly transferred and inserted into the designated destination component by the function of the slanted end surface, even when it initially comes into a collision with the front wall surface of the medium entry/exit of the destination component. In the above-mentioned manner, the present invention eliminates a need for accurately positioning the carrying holder unit relative to the medium entry/exit, which greatly simplifies the necessary positioning control. With the thus-simplified positioning control, the mechanism for carrying the mount can also be significantly simplified, with the result that the cost and size of the recording media library apparatus can be reduced greatly as compared to the known library apparatuses.

What is claimed is:

1. A mount for a recording medium, said mount being transferred at least in a predetermined horizontal transfer direction to be passed to a designated destination component in such a way that the recording medium supported on said mount is received, along with said mount, in place within the destination component, wherein said mount has one end surface oriented in the horizontal transfer direction and said one end surface is slanted in at least a center portion thereof with respect to a direction normal to the horizontal transfer direction and wherein the recording medium has a disk shape and said mount is in the form of a tray suitable for supporting thereon the recording medium.

2. A mount for a recording medium as recited in claim 1 wherein said one end surface of said mount is slanted in a single direction.

3. A mount for a recording medium as recited in claim 2 wherein said one end surface of said mount is slanted arcuately.

4. A mount for a recording medium as recited in claim 1 wherein the one end surface of said mount is slanted inwardly in opposite directions from a midpoint thereof.

5. A mount for a recording medium as recited in claim 4 wherein said one end surface of said mount is slanted arcuately.

6. A mount for a recording medium as recited in claim 1 wherein another end surface of said mount opposite to said one end surface is slanted similarly to said one end surface.

7. A mount for a recording medium as recited in claim 6 wherein said one end surface of said mount is slanted arcuately.

8. A mount for a recording medium as recited in claim 1 wherein said one end surface of said mount is slanted arcuately.

9. A mount for a recording medium as recited in claim 1 wherein said one end surface of said mount is slanted along a substantially full length thereof.

10. A recording media library apparatus comprising:
    a mount for supporting thereon a recording medium having a disk shape, and mount in the form of a tray suitable for supporting thereon the recording medium and having at least one leading edge oriented in a predetermined horizontal transfer direction thereof, said one leading edge being slanted in at least a center portion thereof with respect to a direction normal to the horizontal transfer direction;

a storage section that stores therein a plurality of said mounts each supporting the recording medium;

a medium drive unit that reads and/or write data on the recording medium; and a transportation mechanism that carries said mount between said storage section and said medium drive unit and performs a predetermined handling operation to pass, in the horizontal transfer direction, said mount to or from said storage section or said medium drive unit.

* * * * *